(12) United States Patent
Moore et al.

(10) Patent No.: US 6,904,442 B1
(45) Date of Patent: Jun. 7, 2005

(54) METHOD OF IMPLEMENTING LOGIC FUNCTIONS USING A LOOK-UP-TABLE

(75) Inventors: Michael T. Moore, Santa Clara, CA (US); Haneef D. Mohammed, Beaverton, OR (US)

(73) Assignee: Cypress Semiconductor Corp., San Jose, CA (US)

( * ) Notice: Subject to any disclaimer, the term of this patent is extended or adjusted under 35 U.S.C. 154(b) by 663 days.

(21) Appl. No.: 09/605,503

(22) Filed: Jun. 28, 2000

(51) Int. Cl.[7] ................................. G06F 7/38

(52) U.S. Cl. .......................... 708/235; 708/627

(58) Field of Search .................. 708/235, 627, 708/628, 631

(56) References Cited

U.S. PATENT DOCUMENTS

| | | | | |
|---|---|---|---|---|
| 4,344,151 A | * | 8/1982 | White ........................ 708/622 |
| 4,970,674 A | * | 11/1990 | White ........................ 708/404 |
| 5,117,385 A | * | 5/1992 | Gee ........................... 708/625 |
| 5,255,216 A | * | 10/1993 | Blanz et al. ................. 708/625 |
| 6,307,907 B1 | * | 10/2001 | Kim ........................... 375/377 |
| 6,353,843 B1 | * | 3/2002 | Chehrazi et al. ........... 708/631 |
| 6,427,156 B1 | * | 7/2002 | Chapman et al. .......... 708/235 |
| 6,438,570 B1 | * | 8/2002 | Miller ........................ 708/625 |

* cited by examiner

*Primary Examiner*—D. H. Malzahn
(74) *Attorney, Agent, or Firm*—Christopher P. Maiorana, PC

(57) ABSTRACT

An apparatus comprising one or more look-up-tables (LUTs). The LUTs may be configured to provide logical functions. The one or more LUTs are generally implemented within a multiport memory.

20 Claims, 3 Drawing Sheets

METHOD OF IMPLEMENTING LOGIC FUNCTIONS USING A LOOK-UP-TABLE

FIELD OF THE INVENTION

The present invention relates to a method and/or architecture for implementing functions generally and, more particularly, to a method and/or architecture for implementing logic functions implemented in a look-up-table (LUT).

BACKGROUND OF THE INVENTION

Multipliers can be implemented in programmable logic devices implementing logic, memory or a combination thereof. Multipliers can be implemented in a memory using a look-up-table (LUT). The contents of the LUT, when implemented for a multiplier, are typically written when the device is programmed and are not changed. Recently, programmable logic devices with multiple port memories have become available. The multiple port memories allow a user to perform multiple reads from the same memory in parallel.

Conventional approaches for providing programmable logic multipliers in a memory implement a single port memory, containing a look-up table (LUT) of results. The results are partial products of addresses input to the memory. For each LUT, one partial product can be generated per clock cycle. If a user desires to generate multiple partial products per clock cycle (i.e., typical of fast multipliers), the user must implement multiple LUTs (therefore multiple programmable devices). The multiple LUTs require additional memory resources including area.

Conventional approaches can only read one partial product per LUT, per clock cycle. To provide fast multipliers in conventional approaches, several LUTs must be implemented in parallel. Furthermore, conventional approaches require additional device resources.

SUMMARY OF THE INVENTION

The present invention concerns an apparatus comprising one or more look-up-tables (LUTs). The LUTs may be configured to provide logical functions. The one or more LUTs are generally implemented within a multiport memory.

The objects, features and advantages of the present invention include providing a method and/or architecture for implementing arithmetic and other logic functions that may (i) allow a single multi-port memory to be implemented to generate several partial products per clock cycle, (ii) allow fewer look-up-tables (LUTs) to be implemented in order to generate a given number of partial products, (iii) provide efficient utilization of resources of a programmable device and/or (iv) allow a designer to implement a design in a smaller and cheaper device.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
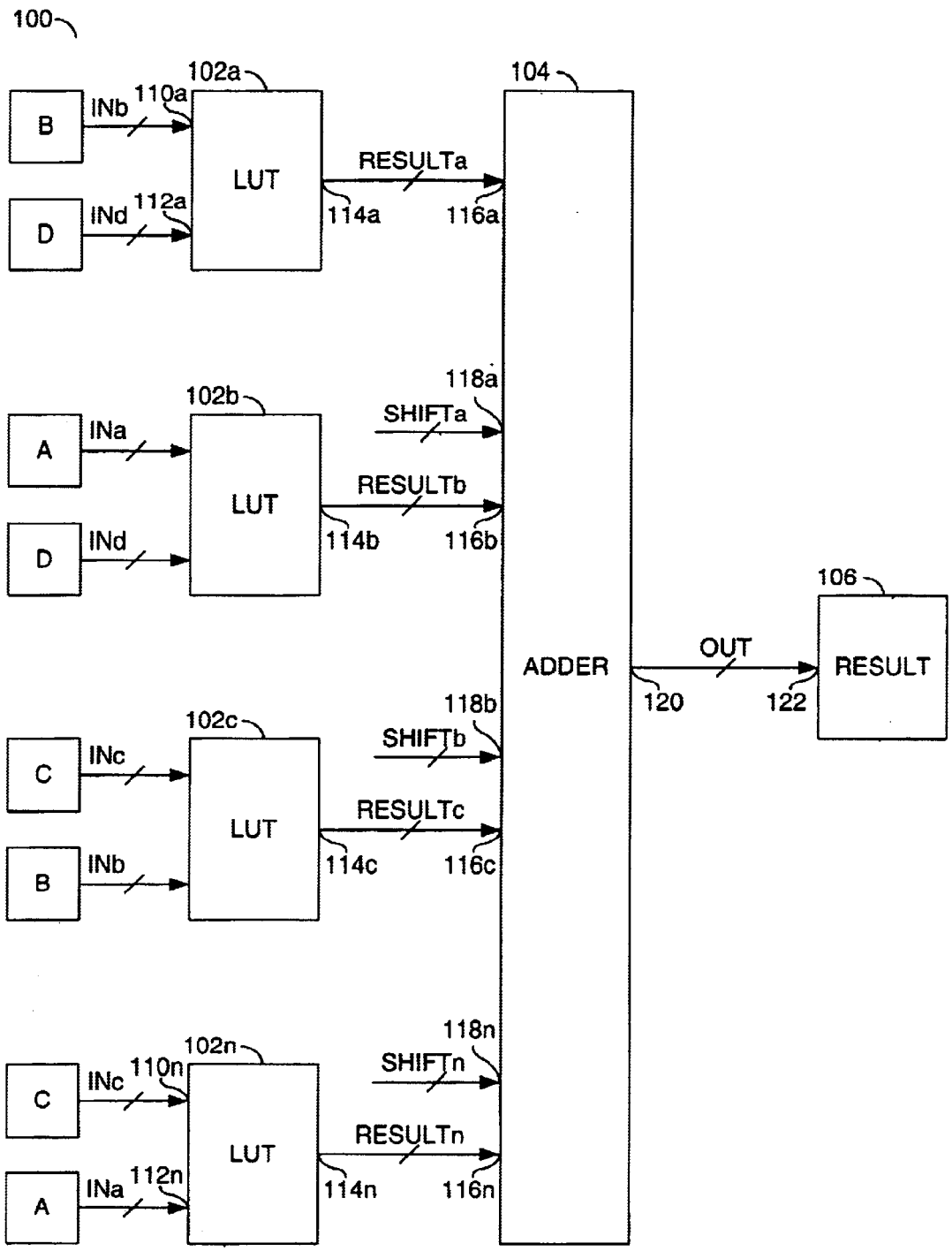
FIG. 1 is a block diagram of a preferred embodiment of the present invention.

Referring to FIG. 1, a block diagram of circuit 100 is shown in accordance with a preferred embodiment of the present invention. The circuit 100 may provide an efficient implementation of multipliers in a multi-port memory. The circuit 100 may provide implementation of logical (e.g., arithmetic or other logic) functions using multi-port memories. The circuit 100 may provide a implementation of logic functions using a multi-port memory that may be area efficient. Additionally, the circuit 100 may allow increased (e.g., faster) performance for look-up-table (LUT) based multipliers. For example, the circuit 100 may implement a pipeline configuration (to be discussed in connection with FIGS. 2 and 3). In one example, the circuit 100 may be implemented as a multi-port multiplier. In another example, the circuit 100 may be implemented as a multi-port LUT based multiplier.

The structure of the circuit 100 generally comprises a number of look-up-tables (LUTs) 102a–102n, an adder block (or circuit) 104 and a result block (or circuit) 106. The LUTs 102a–102n may be implemented as serial and/or parallel devices. Additionally, a particular number of LUTs 102a–102n may be dependent on a structure of the circuit 100. However, the circuit 100 may implement, preferably, a single LUT. In one example, each of the LUTs 102a–102n may be implemented as a port looking into multiple LUTs. In another example, the LUTs 102a–102n may be implemented as a port of a single LUT. The number of LUTs 102a–102n may be related to a number of ports of a multi-port memory. However, each of the LUTs 102a–102n may be implemented as another appropriate device (e.g., single port memory) and/or configuration in order to meet the criteria of a particular implementation. Additionally, a particular number of LUTs 102a–102n may be varied in order to meet the criteria of a particular implementation.

The LUTs 102a–102n may be implemented in order to generate partial products in a multi-port memory. In one example, the circuit 100 may be implemented as a multi-port memory. In another example, the circuit 100 may be implemented as a ROM, RAM, PROM, EPROM, EEPROM, flash memory or other appropriate memory device to meet the design criteria of a particular implementation.

Each of the LUTs 102a–102n may have an input 110 and an input 112. The LUTs 102a–102n may receive a number of signals (e.g., INa–INn) at the inputs 110a–110n and the inputs 112a–112n. For example, the LUT 102a may have the input 110a that may receive the signal INb and the input 112a that may receive the signal INd. The LUT 102a may perform arithmetic or other logic functions with the signal INb and the signal INd. In one example, the signals INa–INn may be implemented as address signals. In another example, the signals INa–INn may be implemented as 8-bit or another appropriate bit size signals. In another example, the signals INa–INn may be implemented as multi-bit and/or single-bit signals in a serial or parallel configuration. Additionally, the particular number of signals INa–INn may be implemented dependent upon a particular configuration of the circuit 100. For example, the input signals INa and Inb may be concatenated on a single input line. However, the input signals INa–INn may be presented to the circuit 100 as another appropriate multi-bit and/or single-bit serial or parallel combination in order to meet the criteria of a particular implementation.

Each of the LUTs 102a–102n may also have an output 114a–114n that may present a signal (e.g., RESULTa–RESULTn), respectively. Each of the signals RESULTa–RESULTn may be presented to an input 116a–116n of the adder block 104. In one example, the signals RESULTa–RESULTn may each be implemented as a partial product. In another example, the signals RESULTa–RESULTn may be implemented as 16-bit signals. In another example, the signals RESULTa–RESULTn may each be implemented as a multi-bit and/or single-bit signal in a parallel or serial configuration. The LUTs 102a–102n may be implemented to perform arithmetic or other logic functions on the partial products RESULTa–RESULTn.

The signals RESULTa–RESULTn may be presented to a number of inputs 116a–116n of the adder block 104, respectively. Additionally, the adder 104 may have a number of inputs 118a–118n that may receive a number of signals (e.g., SHIFTa–SHIFTn). In one example, the signals SHIFTa–SHIFTn may be implemented as inputs to carry chains. In another example, the signals SHIFTa–SHIFTn may be implemented as bit shift signals. In another example, the signals SHIFTa–SHIFTn may be implemented as multi-bit and/or single-bit signals in a serial or parallel configuration.

The shift signals SHIFTa–SHIFTn may be used when adding the partial products (MULTIa–MULTIn) to form the result of the multiply operation. For example, $$\begin{array}{r}AB\\ *CD\\ \hline D \cdot B\\ A \cdot D \leftarrow\\ C \cdot B \leftarrow\\ +C \cdot A \leftarrow \leftarrow\\ \hline RESULT\end{array}$$

Where the arrows '←' may represent logical shifts and the '·' may indicate multiplication. The logical shifts SHIFTa–SHIFTn may be implemented as input signals to the carry chain adder, or to another appropriate type adder. The logical shifts SHIFTa–SHIFTn may indicate a power of a base (e.g., usually base 10) to shift the partial products. Effectively, the shifts are generally replaced with 0 when the addition is done, so the result is:

RESULT=$D \cdot B + A \cdot D0 + C \cdot B0 + C \cdot A00$

The adder block 104 may also have an output 120 that may present a signal (e.g., OUT) to an input 122 of the result block 106. The signal OUT may be implemented as an addition result signal. In one example, the signal OUT may be implemented as a 32-bit result signal. In one example, the signal OUT may be implemented as a multi-bit signal. However, the signal OUT may be implemented as a multi-bit and/or single-bit in a parallel or serial configuration signal. The signal OUT may be generated in response to the signals RESULTa–RESULTn. Additionally, the signal OUT may be generated in response to the signals SHIFTa–SHIFTn.

The adder 104 may be implemented to shift (e.g., the signals SHIFTa–SHIFTn) and sum the partial products RESULTa–RESULTn. In one example, the adder 104 may comprise a sequence of 8-bit carry chains. In another example, the adder 104 may comprise a sequence of varying bit width carry chains. In another example, the adder 104 may be implemented as a 32-bit adder. However, the adder 104 may implement another appropriate bit size and/or number of adders or carry chains in order to meet the criteria of a particular implementation.

The LUTs 102a–102n may be connected by a routable interconnect (not shown). The routable interconnect may link function blocks (e.g., the LUTs 102a–102n and the adder 104). Additionally, the routable interconnect may allow configuration of the LUTs 102a–102n. The multiple interconnect may allow configuration of a bit width and/or depth of the LUTs 102a–102n. The signals SHIFTa–SHIFTn may allow addition of the partial products generated by the LUTs 102a–102n.

The circuit 100 may implement the LUTs 102a–102n in a multi-port memory. In one example, the LUTs 102a–102n may be implemented in a quad port memory. In another example, the LUTs 102a–102n may be implemented in a dual port memory. The multi-port memory 100 may allow a user to provide an address (e.g., the signals INa–INn) to each port (e.g., the LUTs 102a–102n) and read out a partial product (e.g., the signals RESULTa–RESULTn) from each port on each clock cycle. The circuit 100 may allow the user to implement a single multi-port memory to provide functionality that would previously have required several single port memories, in a single clock cycle. The circuit 100 may provide considerable saving of memory resources. The circuit 100 may allow the user to program more logic into a given device. Additionally, the circuit 100 may allow the user to implement a design in a smaller and cheaper device.

Figure 2:
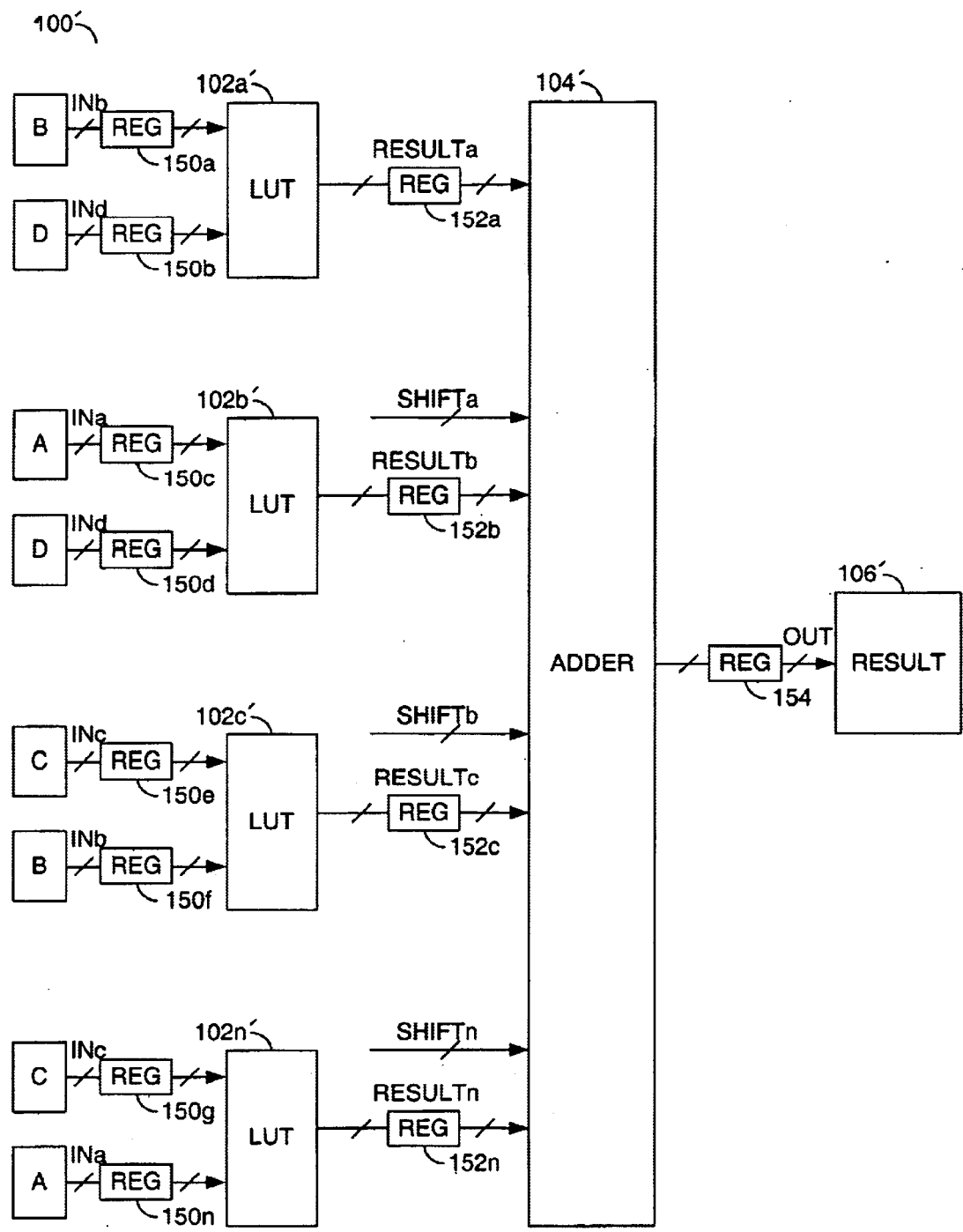
FIG. 2 is a block diagram of another preferred embodiment of the present invention.

Referring to FIG. 2, a block diagram of another preferred embodiment of the present invention is shown, marked with primed notation. The circuit 100' may be similar to the circuit 100. The circuit 100' may illustrate a pipeline configuration of the circuit 100. The circuit 100' may additionally comprises a number of registers 150a–150n, (where n is an integer) a number of registers 152a–152n (where n is an integer) and a register 154. A particular number of registers 150a–150n, 152a–150n and 154 may be varied in order to meet the criteria of a particular implementation. In one example, the registers 152a–150n, 152a–152n and 154 may be implemented as pipeline register stages. However, other appropriate type registers and/or stages may be implemented in order to meet the criteria of a particular implementation. The registers 150a–150n, 152a–152n and 154 may be implemented to increase a throughput of the circuit 100'. However, the circuit 100' may require extra cycles of latency.

Figure 3:
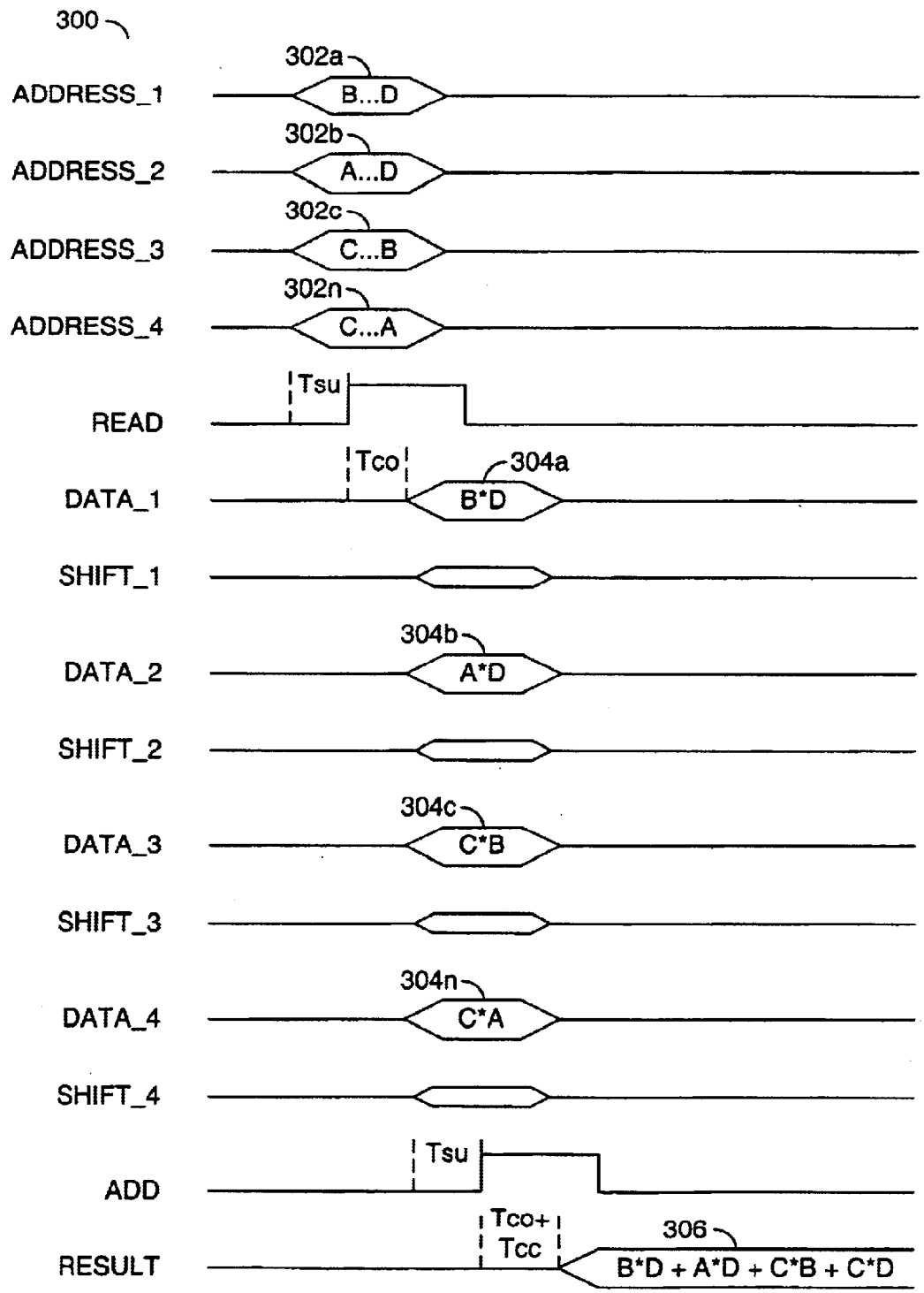
FIG. 3 is a timing diagram illustrating an operation of the present invention.

Referring to FIG. 3, a timing diagram 300 illustrating an operation of the present invention is shown. The timing diagram 300 may illustrate a multiplication operation of the present invention. The timing diagram 300 generally comprises a number of address portions 302a–302n, a number of data portions 304a–304n and a result portion 306. The address portions 302a–302n may correspond to a number of address signals ADDRESS_1–ADDRESS_4, the data portions 304a–304n may correspond to a number of data signals DATA_1–DATA_4 and the result portion 306 may correspond to a result signal RESULT. Additionally, a number of shift signals SHIFT_1–SHIFT_4 may correspond to the data signals DATA_1–DATA_4, respectively.

The timing diagram 300 may illustrate an 8-bit implementation of the address portions 302a–302n and the data portions 304a–304n. Each of the addresses portions 302a–302n may comprise a first and a second operand (e.g., a multiplicand). The first and second operands may be concatenated together in a single address portion 302a–302n. For example, the address portion 302a (ADDRESS_1) may comprise an operand B and an operand D. The operand B may occupy an upper 4-bits of the address portion (ADDRESS_1) and the operand D may occupy a lower 4-bits of the address portion 302a (ADDRESS_1).

A read signal (e.g., READ) may attempt to read the address signals ADDRESS_1–ADDRESS_4. Additionally, the read signal READ may assume that registers exist at an address input to each of the look-up-tables 102a–102n of the circuit 100 (e.g., as described with respect to FIG. 2). The read signal READ may have a delay (e.g., Tsu). The circuit 100 may look up (via the LUTs 102a–102n) a respective multiplication value in response to the signals ADDRESS_–ADDRESS_4. The LUTs 102a–102n may store the respective multiplication values in the data portions 304a–304n (DATA_1–DATA_4). Each data portion 304a–304n (DATA_1–DATA_4) may have a respective shift value (e.g., the signals SHIFT_1–SHIFT_4). Additionally, the data portions 304a–304n (DATA_1–DATA_4) may represent a product of the respective operands. For example, the data portion 304a may represent the product of B*D. Additionally, the data portions 304a–304n may have a delay (e.g., Tco).

A signal (e.g., ADD) may represent an addition of the data signals DATA_1–DATA_4 and the shift signals SHIFT_1_SHIFT_4. The signal ADD may assume that registers exist between the LUTs 102a–102n and the adder 104 (e.g., as described with respect to FIG. 2). Since the adder may have registers, the data signals DATA_1–DATA_4 may not be fully asynchronous. The signal ADD (e.g., the function add via the adder 104) may have a delay equivalent to the delay Tsu. A signal (e.g., RESULT) may correspond to the final result of the addition of the data values DATA_1–DATA_4. The signal RESULT (e.g., the result block 106) may have a delay that may be equivalent to the delay Tco and a delay (e.g., Tcc). The delay Tcc may be implemented as a time delay through carry chains or other appropriate arithmetic devices. The time delay Tcc may vary in response to a particular implementation of circuit 100.

The circuit 100 may allow a single multi-port memory to be implemented to generate several partial products per clock cycle. The circuit 100 may allow fewer LUTs to be implemented in order to generate a given number of partial products. The circuit 100 may provide efficient utilization of resources for a programmable device. The circuit 100 may provide faster performance for look-up-tables. Additionally, the circuit 100 may allow a designer to implement a design in a smaller and cheaper device.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a first look-up-table configured to generate a first partial product signal from a first address formed by concatenating a first input signal and a second input signal;
    a second look-up-table configured to generate a second partial product signal from a second address formed by concatenating a third input signal and a fourth input signal; and
    a logic circuit configured to generate an output signal in response to said first partial product signal and said second partial product signal, wherein said first look-up-table and said second look-up-table are implemented within a multiport memory.

2. The apparatus according to claim 1, wherein said multiport memory comprises a dual port memory.

3. The apparatus according to claim 1, wherein said multiport memory comprises a quad port memory.

4. The apparatus according to claim 1, wherein said multiport memory is selected from a group consisting of a RAM, a ROM, a PROM, an EPROM, an EEPROM, and a flash memory.

5. The apparatus according to claim 1, wherein said first input signal is substantially equal to one of said third input signal and said fourth input signal.

6. The apparatus according to claim 1, wherein said first input signal comprises a single-bit serial configuration.

7. The apparatus according to claim 1, further comprising:
    a third look-up table configured to generate a third partial product signal from a third address formed by concatenating said first input signal and said fourth input signal.

8. The apparatus according to claim 7, further comprising:
    a fourth look-up-table configured to generate a fourth partial product signal from a fourth address formed by concatenating said second input signal and said third input signal.

9. The apparatus according to claim 8, wherein said logic circuit is further configured to generate said output signal in further response to said third partial product signal and said fourth partial product signal.

10. The apparatus according to claim 1, wherein said logic circuit is further configured to shift said first partial product signal in response to a first shift signal before generating said output signal.

11. The apparatus according to claim 10, wherein said logic circuit is further configured to shift said second partial product signal in response to a second shift signal before generating said output signal.

12. The apparatus according to claim 1, further comprising:
    a plurality of registers disposed between said first and said second look-up-tables and said logic circuit.

13. The apparatus according to claim 1, wherein said first partial result signal is an arithmetic function of said first input signal and said second input signal.

14. An apparatus comprising:
    means for generating a first partial product signal by looking-up a first address formed by concatenating a first input signal and a second input signal to a multiport memory;
    means for generating a second partial product signal by looking-up a second address formed by concatenating a third input signal and a fourth input signal to said multiport memory; and
    means generating an output signal in response to said first partial product signal and said second partial product signal.

15. A method for implementing logical functions, comprising the steps of:
    (A) generating a first partial product signal by looking-up an address formed by concatenating a first input signal and a second input signal to a multiport memory;
    (B) generating a second partial product signal by looking-up a second address formed by concatenating a third input signal and a fourth input signal to said multiport memory; and
    (C) generating an output signal in response to said first partial product signal and said second partial product signal.

16. The method according to claim 15, wherein said first partial product signal is a logical function of said first input signal and said second input signal.

17. The method according to claim 15, wherein said first input signal has a single-bit serial configuration.

18. The method according to claim 15, wherein said multiport memory is selected from a group consisting of a RAM, a ROM, a PROM, an EPROM, an EEPROM, and a flash memory.

19. The method according to claim 15, wherein step (C) comprises the step of:
    adding said first partial product signal and said second partial product signal.

20. The method according to claim 19, further comprising the step of:
    shifting said first partial product signal in response to a first shift signal before adding to said second partial product signal.

* * * * *